United States Patent [19]

Helm

[11] 4,299,346
[45] Nov. 10, 1981

[54] AUTOMOBILE LUGGAGE RACK

[75] Inventor: Frederick A. Helm, Detroit, Mich.

[73] Assignee: Auto Trends, Inc., Detroit, Mich.

[21] Appl. No.: 81,673

[22] Filed: Oct. 4, 1979

[51] Int. Cl.³ .............................................. B60R 9/04
[52] U.S. Cl. .................................... 224/325; 224/326
[58] Field of Search ............... 224/325, 326, 309, 917,
224/316, 324; 280/769

[56] References Cited

U.S. PATENT DOCUMENTS

| Re. 26,538 | 3/1969 | Bott | 224/326 X |
|---|---|---|---|
| 3,223,302 | 12/1965 | Helm | 224/325 X |
| 3,330,454 | 7/1967 | Bott | 224/326 X |
| 4,030,647 | 6/1977 | Rasor et al. | 224/325 |
| 4,155,585 | 5/1979 | Bott | 224/324 X |
| 4,182,471 | 1/1980 | Bott | 224/326 |

*Primary Examiner*—Steven M. Pollard
*Attorney, Agent, or Firm*—Fisher, Gerhardt, Crampton & Groh

[57] ABSTRACT

A luggage rack assembly for automobile deck lids and the like having a pair of identical rear corner supports with a tubular rear rail extending between and received over opposed first tongues of the rear supports. Each rear corner support further has a pair of second tongues projecting respectively forwardly and rearwardly on a line beneath the first tongues. A tubular front rail extends between and is received over opposed third tongues one protruding from each of a pair of identical front corner supports, each of which also has a pair of fourth tongues projecting forwardly and rearwardly on a line coplanar with said third tongues. Tubular side rails extend between and are received over opposed ones of said second and fourth tongues in a plane with said front rail beneath said rear rail. The front and rear corner supports are fixedly mounted to the deck lid by four identical base members each receiving a one of the corner supports by snap fit. The rear corner posts are received by loose snap-fit into the associated base members to provide limited universal adjustable motion of the base members to conform to surface contour of a said deck lid. A plurality of spaced tubular cross rails are suspended in the plane of the front and side rails by rail connectors slidably received over the side and front rails and having a projecting tongue received within the cross rails.

15 Claims, 14 Drawing Figures

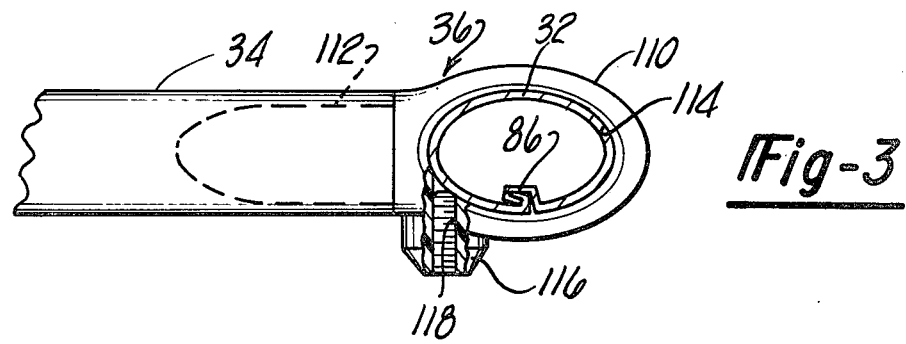
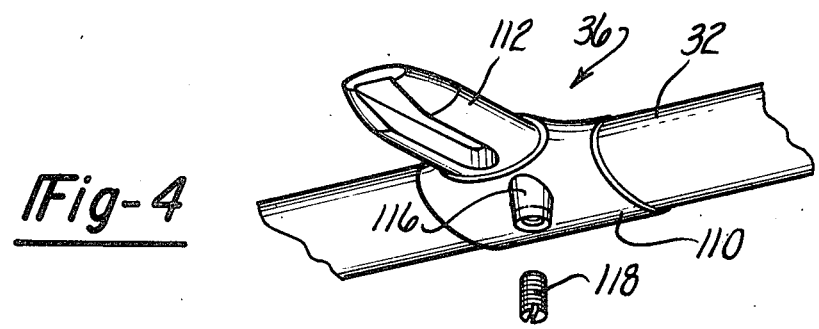
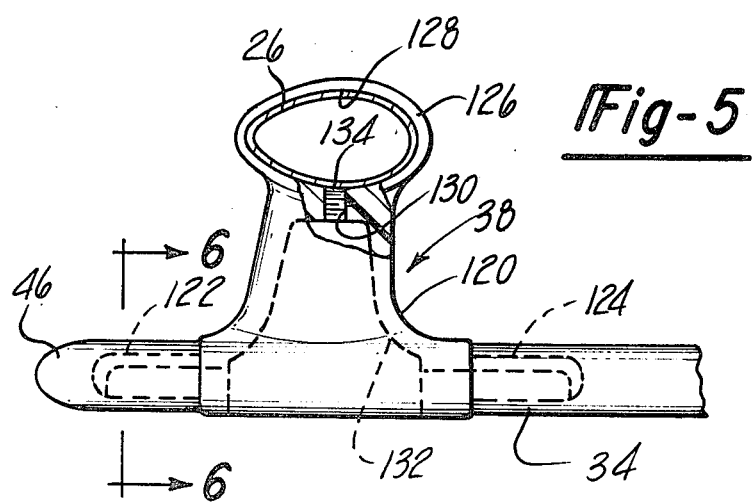

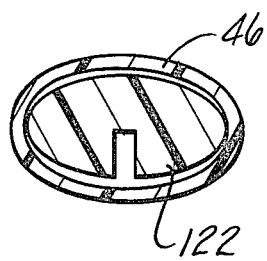
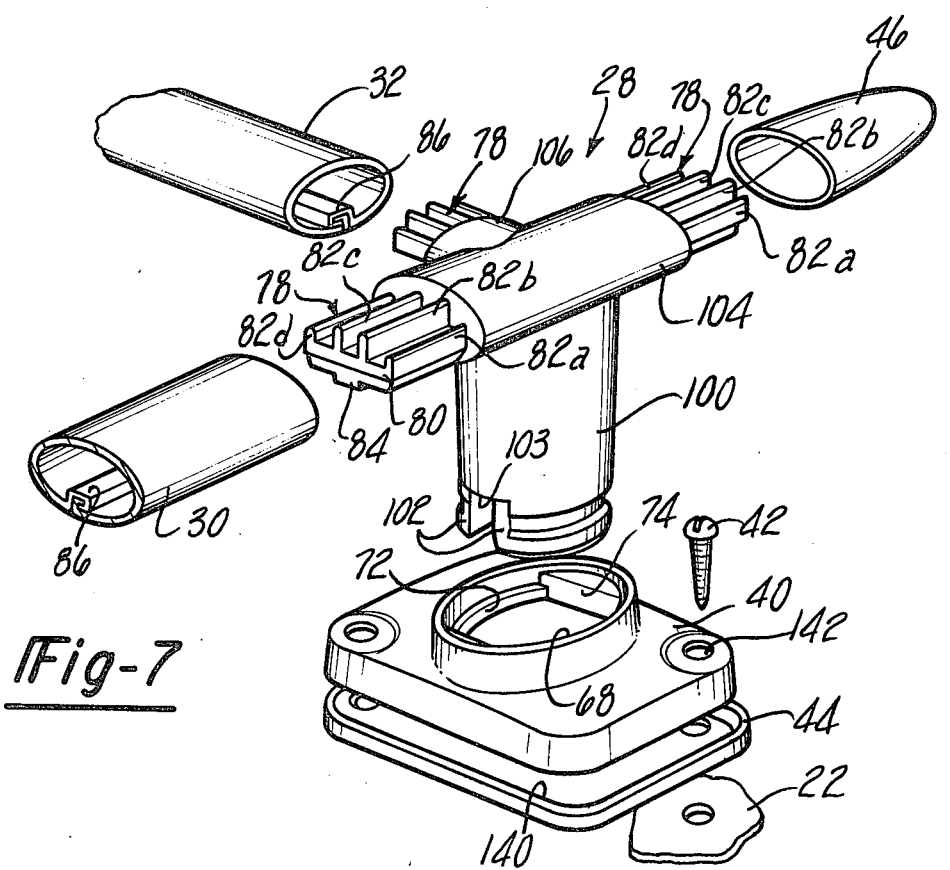
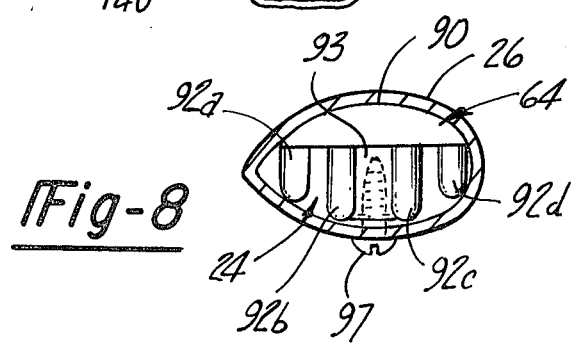

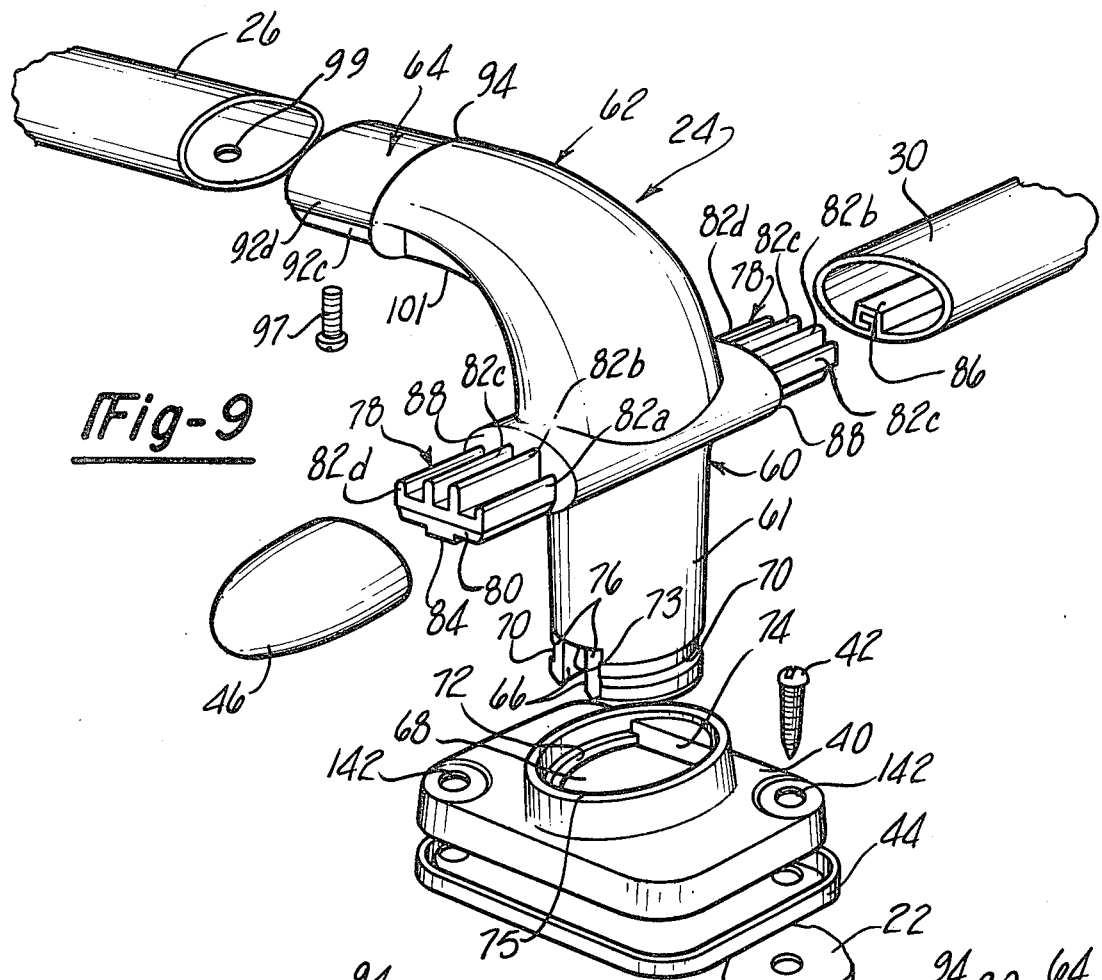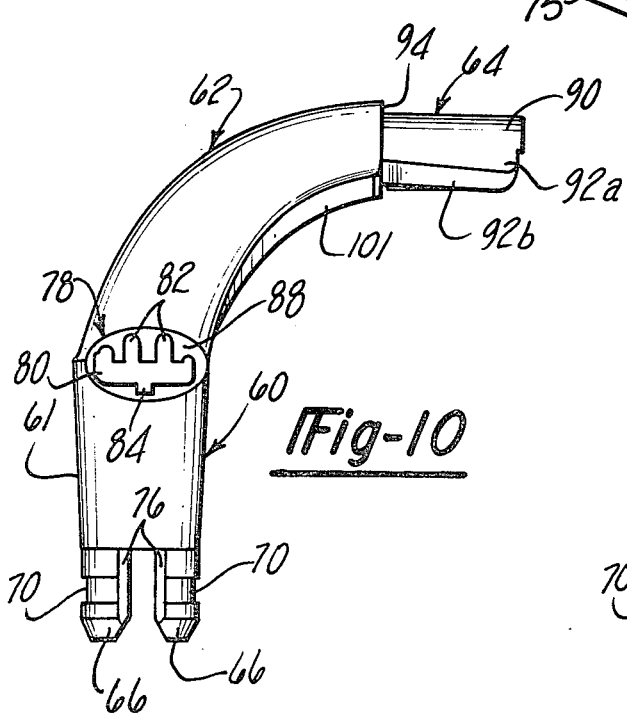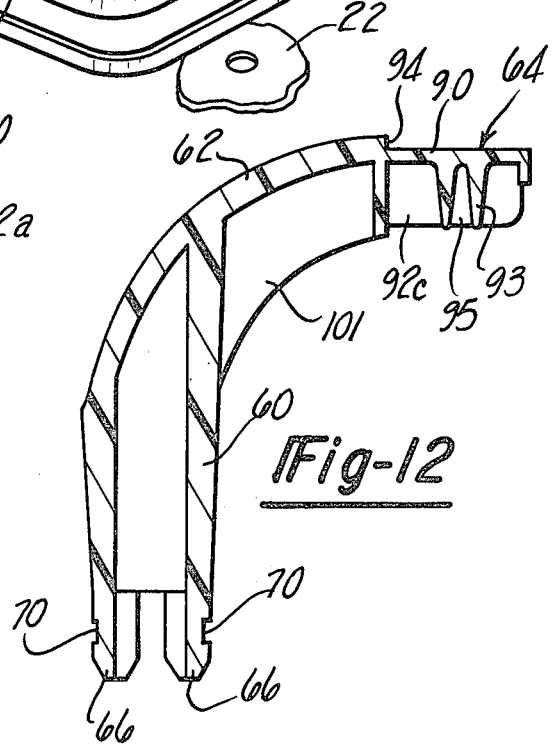

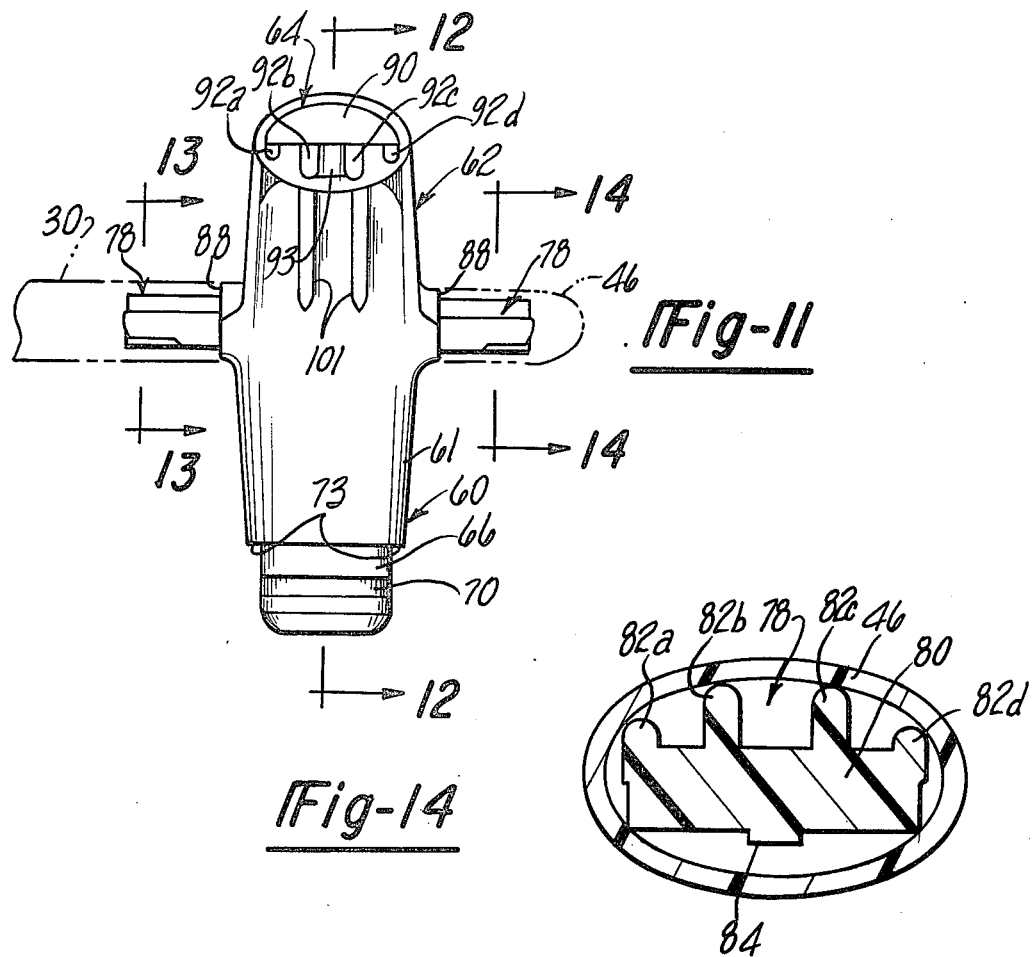
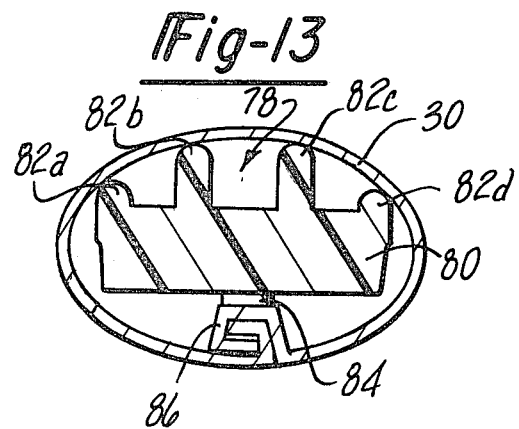

AUTOMOBILE LUGGAGE RACK

The present invention is directed to automobile accessories, and more particularly to racks adapted to be mounted to the automobile trunk lid for augmenting luggage carrying capacity.

BACKGROUND OF THE INVENTION

Deck racks characteristic of the prior art generally have comprised one-piece welded structures of tubular metal such as cold rolled, polished and chrome plated steel. Racks of this type are expensive to fabricate, transport and store, particularly for aftermarket sale, since the one-piece structure requires a relatively large shipping container. Attempts have been made to provide luggage racks as multiple-piece assemblies for aftermarket sale wherein the user assembles the rack prior to installation onto his deck or trunk lid. However, racks of the latter type involve an expensive multiplicity of different parts and are often difficult to assemble and install.

OBJECTS AND SUMMARY OF THE INVENTION

Accordingly, one object of the present invention is to provide a luggage rack for automobile deck lids which is inexpensive to manufacture and transport, which is particularly well adapted for sale and installation in the automobile aftermarket, and/or which may be readily assembled and installed by the average purchaser.

Another object of the invention is to provide a deck lid luggage rack which possesses and maintains a pleasing aesthetic appearance over long duration and extended usage.

A further object of the invention is to provide a multiple-piece deck rack for both original equipment and aftermarket assembly which comprises substantial numbers of identical parts.

Yet another object of the invention is to provide a rack assembly which is adapted for installation onto the deck lid of a wide variety of automobile models or types. In furtherance of the foregoing, another object of the invention is to provide widely different alternative rack assembly structures models or embodiments for installation onto differing car models but which embody a substantial number of common parts.

In accordance with the invention, there is provided a multiple-piece deck lid rack assembly comprising a pair of rear corner supports and a pair of front corner supports interconnected by a plurality of tubular rails. (In the following description and the appended claims, directional words such as "front", "rear", and "side" are taken with reference to preferred structural orientation of the invention on the downwardly sloping rear deck or trunk lid of the typical automobile, and in this connection such directional adjectives are to be construed as words of description rather than limitation.). The rear supports are identical to each other and are connected to each other by a laterally extending main support rail. The rear supports are connected to the front supports and the front supports are connected to each other by rails of smaller size in a luggage support plane disposed below the rear rail. In one embodiment, additional rails extend laterally of the rack in the support plane and are coupled to the longitudinally extending side rails by rail connectors. In another embodiment of the invention, cross rails extend longitudinally of the rack in the support plane, are coupled to the front lateral rail by rail connectors and are suspended from the rear rail by hangers. The several corner supports are received by snap fit into corresponding base members which, in turn, are fastened to the deck lid.

The rail connectors, hangers, corner supports and bases are of molded plastic construction and plated to provide a bright metallic finish. Preferably the plastic material is from the group consisting of ABS, NORYL. The rails are constructed of tubular stainless steel. Thus, the entire assembly is of aesthetic appearance and, when mounted to the deck lid, provides a structure which virtually does not itself corrode or foster corrosion of the deck lid. The same rear corner supports, front corner supports and rail hangers are utilized in both embodiments. The base member is the same for each corner support and for both embodiments. This commonality of parts reduces complexity and inventory expense. Each embodiment may be provided in kit form, and may be assembled and installed by persons with little or no mechanical aptitude.

BRIEF DESCRIPTION OF THE DRAWINGS

Presently preferred embodiments of the invention are illustrated in the accompanying drawings in which:

FIG. 3 is a sectional view taken along the line 3—3 in FIG. 1;

FIG. 4 is a fragmentary partially exploded view of the rail connection assembly illustrated in FIG. 3;

FIGS. 5 and 6 are sectional views taken along the lines 5—5 and 6—6 in FIGS. 1 and 5 respectively;

FIG. 7 is an exploded perspective view on an enlarged scale of a front corner support and rail assembly.

FIG. 8 is a sectional view taken along the line 8—8 in FIG. 1;

FIG. 9 is an exploded perspective view on an enlarged scale of a rear corner support and rail assembly;

FIGS. 10 and 11 are respective side and front elevational views of a rear corner support member; and FIGS. 12, 13 and 14 are sectional views taken along the respective lines 12—12, 13—13 and 14—14 in FIG. 11.

DETAILED DESCRIPTION OF THE PREFERRED EMBODIMENTS

Figure 1:
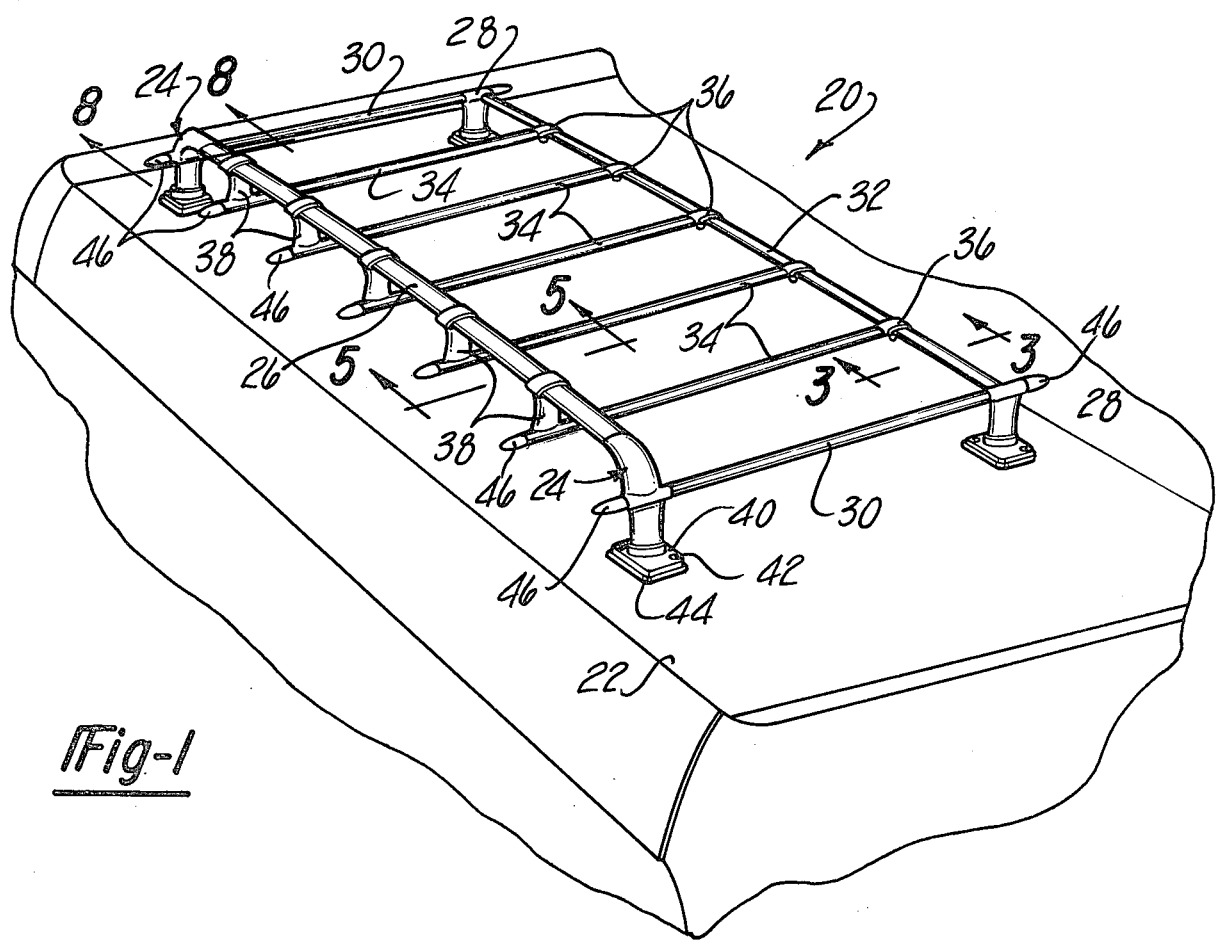
FIG. 1 is a fragmentary perspective view of one embodiment of the deck lid luggage rack provided by the invention.

FIG. 1 illustrates a presently preferred embodiment 20 of the invention which is particularly well adapted for installation onto the rear deck lid 22 of Chevrolet Camaro or Corvette automobile models, or other models of similar rear deck lid size, slope and configuration. Assembly 20 comprises a pair of inwardly directed rear corner supports 24 connected to each other by a tubular rear rail 26. A pair of front corner supports 28 are respectively connected to rear corner supports 24 by the longitudinally extending tubular side rails 30, and are connected to each other by the laterally extending tubular front rail 32. Side rails 30 and front rail 32 are carried in a plane generally parallel with the plane of deck lid 22 and disposed beneath the level of rear rail 26.

A plurality of longitudinally extending laterally spaced cross rails 34 are joined to front rail 32 by the respective rail connectors 36 and are suspended beneath rear rail 26 in the plane of side rails 30 and front rail 32 by the hangers 38. Thus, rails 30,32 and 34 define a support plane mounted above the rearwardly sloping surface of deck lid 22 and beneath the level of rear rail 26 such that luggage or the like placed on the support plane tends to slide downwardly against rail 26. Corner supports 24,28 are received by snap fit into the base members 40 which in turn are fixedly mounted on deck lid 22 by the sheet metal screws 42, with a resilient base gasket 44 being disposed between each base 40 and the surface of the deck lid. Decorative end caps 46 are received on corner supports 24,28 and on the hangers 38 for completing the rack assembly.

Figure 2:
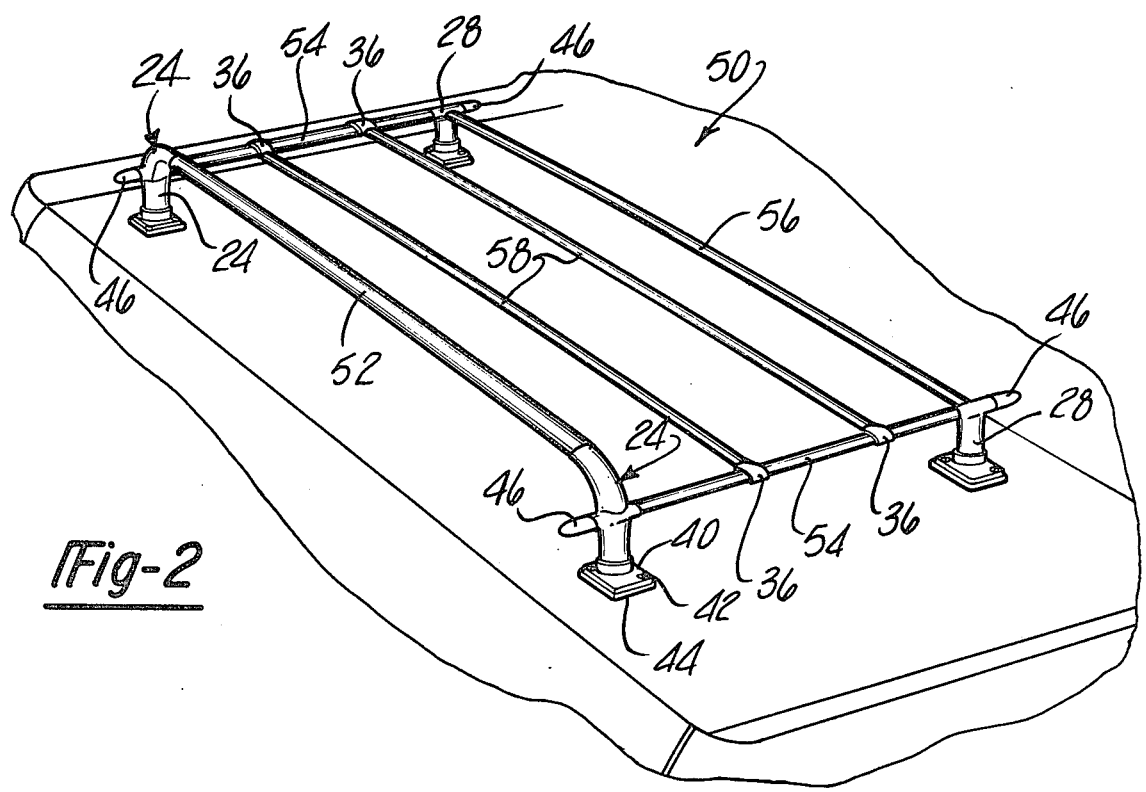
FIG. 2 is a fragmentary perspective view of another preferred embodiment of the invention.

An alternative embodiment 50 of the rack assembly in accordance with the invention adapted to be mounted to the rear deck lid of most conventional automobiles is illustrated in FIG. 2. In embodiment 50, elements or parts identical to the parts in FIG. 1 are identified by identical reference numerals. In the embodiment of FIG. 2, the rear corner supports 24 are connected to each other by the rear rail 52. The front corner supports 28 are connected to rear supports 24 by the side rails 54, and are connected to each other by the front laterally extending rail 56. A pair of longitudinally spaced cross rails 58 are suspended between side rails 54 by the rail connectors 36 and cooperate with rails 54,56 for defining the load support plane. Rail 52 in FIG. 2 differs from rail 26 in FIG. 1, and rails 54,56 and 58 in FIG. 2 differ from rails 30,32 and 34 in FIG. 1 only in length.

The individual parts or elements in the embodiment 20 in FIG. 1, the structural interrelationship therebetween and the manner of assembly will now be described in detail in connection with FIGS. 3-14. Rear corner support 24 is illustrated in FIGS. 9-14 and comprises a one-piece body having a generally T-shaped lower section 60 for engaging base 40 and an integral arcuate upper portion 62 terminating in a tongue 64 adapted to be received within rear rail 26. The leg 61 of lower body section 60, which is substantially oval in cross section (not shown), terminates in a pair of axially extending outwardly slotted tongues 66 which are adapted to be received by snap fit within a central opening 68 in base 40 such that the grooves 70 in tongues 66 snap over opposing ribs 72 (FIG. 9) in base opening 68. Side ribs 74 in base opening 68 cooperate with flat portions 76 on tongues 66 for guiding the tongues into openings 68. An oval lip 75 upstanding from base 40 surrounds opening 68 and the lower end of leg 61 when the leg is inserted into opening 68 until ledges 73 (FIGS. 9 and 11) on leg 71 abut the opposing shoulders 74 and tongues 66 snap over the ribs 72. Preferably, the snap fit connection of tongues 66 with ribs 72 is slightly "sloppy" for limited universal movement between support 24 and base 40 thereby to accommodate slight variations in deck lid contour.

A pair of wings 78 extend to either side of support leg section 61. As best seen in FIGS. 13 and 14, each wing 78 terminates in a generally planar platform 80 having four convex support ribs 82 upstanding therefrom and a flat rib 84 centrally disposed beneath platform 80. The outer ribs 82a,82d are shorter than are the inner ribs 82b,82c, with the rib edges being disposed in an arc for cooperating with the inside surface of side rail 30 (FIG. 13) and end cap 46 (FIG. 14) press fitted thereover. Side rails 30 (FIGS. 9 and 13) are of oval cross section, and are precut to desired lengths from stainless steel stock rolled into oval-tubular form and crimped as at 86. The crimped "lock seam" roll formed tubes prevent rotation of the tubes to maintain sweeps of tubing in proper relationship to the car roof or body. Wings 78 are adapted to receive side rails 30 by interference press-fit over ribs 82,84 as illustrated in FIG. 13 such that lower rib 84 bears against tube crimp 86 and upper ribs 82a,82d bear against the opposing inside wall of tube 30. Rail 30 is pressed onto wings 78 until the tube end abuts the oval shoulder 88. End caps 46 are fabricated to fit over wings 78 in engagement with the lower outside edges of platform 80 and the upper surfaces of outer ribs 82a and 82d as illustrated in FIG. 14.

Tongue 64 comprises an arcuate ledge 90 having concave ribs 92a, 92d depending therefrom. Outer ribs 92a,92d are shorter than are inner ribs 92b,92c, the rib edges being disposed in an arc as best illustrated in FIGS. 8 and 11. A boss 93 bridges ribs 92c,92d and has an opening 95 (FIG. 12) formed therein. Rear rail 26 is cut to desired length from rolled and crimped stainless steel stock having a substantially teardrop-shaped cross section best seen in FIG. 8 to prevent rotation thereof on tongue 64. This cross section, which is substantially larger than is the cross section of side rails 30, is adapted to be received by press-fit over the ledge 90 and ribs 92a,92d of tongue 64, with the side edge of rail 26 of greater radius facing forwardly. Rail 26 is fitted over tongue 64 until the rail end abuts the shoulder 94 on upper support section 62 from which tongue 64 extends. Shoulder 94 is oval in cross section for blending with the surface of rail 26. A screw 97 (FIGS. 8 and 9) is then threaded through an opening 99 in the rail end into opening 95 in tongue 64 for firmly securing tube 26 onto corner support 24.

As best appreciated from FIGS. 11 and 12, arcuate support section 62 comprises an open-bottomed structure to facilitate injection molding and having support ribs 101. It will be appreciated from the drawings and from the foregoing description that rear corner support 24 is symmetrical about the line 12—12 in FIG. 11 whereby the same support 24 may be used at both the left and right rear corners of the racks 20 and 50 as previously described in connection with FIGS. 1 and 2.

Front corner support 28 is illustrated in FIG. 7 and comprises a generally T-shaped structure having a base 100 terminating in opposed outwardly grooved axially extending tongues 102. Whereas tongues 66 (FIG. 9) are adapted to be received by loose snap fit into base openings 68 as previously described, the tongues 102 on front corner support 28 are dimensioned to be received by tight or rigid snap fit over the ribs 72 in base openings 68 with the ledges 103 on base 100 tight against shoulder 74. The projecting wings 104 of front corner support 28 terminate in ribbed tongues 78 which are substantially identical in structure and function to the tongues 78 on rear corner support 24 as previously described, receiving on one side the forward end of side rail 30 and on the other side the end cap 46. A third wing 106 projects laterally from the wings 104 of front corner support 28 to receive by press-fit the side end of front rail 32. Front rail 32 is cut to desired length from the same rolled and crimped tube stock as are side rails 30, such that wing 106 may be and preferably is substantially identical in structure and function to tongues 78 previously described. As was the case with rear corner supports 24, front corner support 26 is symmetrical about a lateral plane bisecting wing 106 and leg 100, whereby the same support may be used at both right and left front corners as previously described in connection with FIGS. 1 and 2.

Rail connectors 36 are best illustrated in FIGS. 3 and 4 and comprise an essentially T-shaped one-piece body 110 having a tongue 112 axially extending from the leg of the T for press-fit reception into cross rails 34 (FIGS. 1 and 3) or 58 (FIG. 2). An oval opening 114 extends through the wings of body 110 and is adapted slidably to receive front rail 32 (FIG. 1) or side rail 54 (FIG. 2). An internally apertured boss 116 is carried by body 110 offset from the centerline of tube-receiving opening 114 in the direction of tongue 112. A self-tapering cup point set screw 118 is received in boss 116 for both clamping tube 32 within opening 114 and wedging the tube forwardly of the opening such that with set screw 118 tightened, rail connector is effectively fixed in rigid position on tube 32.

Referring to FIGS. 5 and 6, hanger 38 essentially comprises an inverted hollow T-shaped body 120 having a pair of tongues 122,124 projecting rearwardly and forwardly from the wings of body 120 and respectively adapted to receive by press-fit end cap 46 and the rearward end of cross rail 34. The upper end of body 120 terminates in a laterally extending collar 126 having a teardrop-shaped opening 128 extending therethrough for slidably receiving rear rail 26. An opening 130 couples the internal cavity 132 of body 120 with collar opening 128, and is adapted to receive a self-tapping cup-point set screw 134 for firmly clamping body 128 in desired position lengthwise of tube 26.

In fabrication, corner supports 22,28, rail connectors 36, bases 40 and hangers 38 are injection molded of chrome plateable plastic material such as ABS high strength General Electric NORYL polycarbonate or even higher strength reinforced mineral filled nylon. The plastic elements are then plated with a virtually non-corrosive metallic finish which closely matches in appearance the finish of the stainless steel rails. Gaskets 44 may be of any suitable materials such as rubber. Rear rails 26 (FIG. 1) and 52 (FIGS. 2) are cut to desired lengths from teardrop-shaped tube stock. Similarly, rails 30,32 and 34 (FIG. 1) or 54,56,58 (FIG. 2) are cut to desired lengths from oval stainless steel tube stock. End caps 46 are molded of any suitable decorative black plastic material.

In assembly of the embodiment of FIG. 1, the individual parts or elements may be provided in completely unassembled form in the form of a kit. Preferably, however, hangers 38 and rail connectors 36 are respectively positioned at the factory on rails 26 and 22, and are clamped thereon by set screws 134,118. This procedure does not materially increase package size and insures uniformity in cross rail spacing. When the kit or package is opened cross rails 34 are first fitted over hanger tongues 124 (FIG. 5) making sure that the seam in the cross rails is positioned underneath so as to present a smooth, more aesthetic appearance when finally assembled. The tongues 112 (FIGS. 3 and 4) on rail connectors 36 are then aligned with the front ends of cross rails 34 and pressed therein. Front and rear corner supports 28,24 are assembled to side rail 30 and then pressed into the open side ends of front and rear rails 32,26. Screws 97 are then located and tightened as described in connection with FIG. 9. Bases 40 are snapped over the ends of corner supports 24,28. The upwardly projecting lip 140 on gaskets 44 are then fitted over the outside of bases 40, and the entire assembly is placed on deck lid 22 for use as a template. Care must be taken at this point to insure that the assembled rack is laterally centered on the deck lid and positioned longitudinally at a location which will not interfere with the rear window of the automobile (not shown) when the lid is raised.

Using the openings 142 in the bases 140 as a template, the corner positions are marked on the deck lid and holes are drilled using a suitable size drill bit. The rack assembly is then affixed to the deck lid by the sheet metal screws 42. Finally, the decorative end caps 46 are positioned over the projecting tongues on corner supports 24,28 and hangers 38. Assembly and mounting of the alternative embodiment of FIG. 2 may proceed in a similar manner.

The invention claimed is:

1. A rack assembly for automobile deck lids and the like comprising
   a pair of identical rear corner supports having laterally projecting opposed first tongues and each further having a pair of second tongues projecting forwardly and rearwardly on a line beneath said first tongues,
   a pair of identical front corner supports having laterally projecting opposed third tongues and each further having a pair of fourth tongues projecting forwardly and rearwardly on a line coplanar with said third tongues,
   a tubular rear rail extending between and received over said opposed first tongues,
   a tubular front rail extending between and received over said opposed third tongues,
   tubular side rails extending between and received over opposed ones of said second and fourth tongues in a plane with said front rail beneath said rear rail,
   means for mounting said front and rear corner supports to a deck lid, and
   decorative cover means received over ones of said second and fourth tongues not received in said side rails.

2. The rack assembly set forth in claim 1 further comprising a plurality of spaced tubular cross rails and means for suspending said cross rails in the plane of said front and side rails.

3. The rack assembly set forth in claim 2 wherein said suspending means comprises rail connectors adapted to be slidably received over said side and front rails and each having a projecting tongue adapted to be received within said cross rails.

4. The rack assembly set forth in claim 3 wherein said cross rails extend longitudinally of said rack, wherein said rail connectors are slidably received on said front rail, and wherein said suspending means further comprises hanger means having a first section adapted to be slidably received over said rear rail, and a second section depending from said first section and having an extending tongue adapted to be received within said cross rail.

5. The rack assembly set forth in claim 4 wherein said hanger means and said rail connectors each include means for clamping said hanger means and said rail connectors in fixed position on the associated rails.

6. The rack assembly set forth in claim 3 wherein said cross rails extend laterally of said rack, and wherein said rail connectors include first and second sets of rail connectors respectively slidably received on said side rails.

7. The rack assembly set forth in claim 3 or 4 wherein all of said tongues are adapted to be received by interference press fit into the corresponding tubular rails.

8. The rack assembly set forth in claim 7 wherein all of said rails are non-circular in cross-section to prevent rotation on said tongues.

9. The rack assembly set forth in claim 3 wherein each of said rail connectors include means defining a first opening adapted to slidably receive said rails, means defining a second opening orthogonal to and offset from the axis of said first opening, and a set screw received in said second opening for wedgingly clamping said rail connector into a said rail received in said first opening.

10. The rack assembly set forth in claim 3 wherein said mounting means comprises four identical base members each receiving one of said corner supports.

11. The rack assembly set forth in claim 10 wherein said each corner support is received by snap fit into the corresponding base member.

12. The rack assembly set forth in claim 11 wherein said rear corner posts are received by loose snap-fit into the corresponding pair of said base members to accommodate limited adjustable motion of said pair of base members to conform to surface contour of a said deck lid.

13. The rack assembly set forth in claim 3, 4 or 10 wherein said corner supports, said rail connectors, said hanger means and said base members are all constructed of non-corrosive plastic material.

14. The rack assembly set forth in claim 13 wherein said material is selected from the group consisting of ABS, NORYL or reinforced nylon.

15. The rack assembly set forth in claim 13 wherein all of said rails are constructed of tubular stainless steel, and wherein said supports, rail connectors, hanger means and base members are plated to match said rails.

* * * * *